United States Patent [19]
Rimback

[11] Patent Number: 5,735,260
[45] Date of Patent: Apr. 7, 1998

[54] TILE FOR USE WITH A COOKING GRILL

[75] Inventor: Peter Rimback, Oakwood, Ohio

[73] Assignee: Hanover Catalog Holdings, Inc., Weehawken, N.J.

[21] Appl. No.: 640,356

[22] Filed: Apr. 30, 1996

[51] Int. Cl.⁶ .................................................. F24C 3/00
[52] U.S. Cl. ........................................ 126/41 R; 126/39 J
[58] Field of Search ............................. 126/25 R, 41 R, 126/39 J; 99/401, 447, 444, 450

[56] References Cited

U.S. PATENT DOCUMENTS

| | | | |
|---|---|---|---|
| D. 186,320 | 10/1959 | Mustin | D32/1 |
| D. 272,847 | 2/1984 | Koziol | D23/166 |
| 284,295 | 9/1883 | Hailes | 99/444 |
| D. 356,008 | 3/1995 | Reiger et al. | D7/416 |
| 1,200,741 | 10/1916 | Lindgren | 99/450 |
| 2,908,214 | 10/1959 | Persinger | |
| 3,199,438 | 8/1965 | Myler et al. | 99/450 |
| 3,692,013 | 9/1972 | Grafton et al. | 126/41 |
| 4,351,313 | 9/1982 | Kern | 126/39 |
| 4,403,597 | 9/1983 | Miller | 126/41 R |
| 4,535,748 | 8/1985 | Hunerwadel | 126/25 |
| 4,603,052 | 7/1986 | El-Hag et al. | 99/450 |
| 5,111,803 | 5/1992 | Barker et al. | 431/326 |
| 5,121,738 | 6/1992 | Harris | 126/41 R |
| 5,226,405 | 7/1993 | Snow | 126/25 B |
| 5,363,751 | 11/1994 | Prestigiacomo | 99/450 |
| 5,367,951 | 11/1994 | Purvis | 99/450 |

OTHER PUBLICATIONS

Grill Lover's Catalog, Char-Broil, 1995.
Barbecue Accessories, Meteor Inc. (no date).

Primary Examiner—Carl D. Price
Attorney, Agent, or Firm—Thompson Hine & Flory LLP

[57] ABSTRACT

A tile for use with a cooking grill includes a base with top and bottom surfaces and a plurality of frusto-conical bosses extending upwardly form the top surface, each boss having a channel extending substantially vertically through the tile to the bottom surface. The channels and bosses are shaped to allow food drippings to flow through the tile such that a portion of the food drippings falling upon the top surface collect and are vaporized, and a smaller portion flows through the channel to exit the bottom surface. In a preferred embodiment, the tile includes dimples formed in its upper surface to collect drippings to vaporize and promote cooking of an associated food product.

24 Claims, 2 Drawing Sheets

TILE FOR USE WITH A COOKING GRILL

BACKGROUND OF THE INVENTION

The present invention relates to gas-fired or electrical cooking grills, and, more particularly, to a non-combustible tile used with such cooking grills.

Gas-fired and electrical cooking grills are popular for home use, and differ from traditional barbecue grills in that they rely upon a gas flame or an electrical resistance element for heat energy, as opposed to the combustion of charcoal briquettes or the like. Such gas or electrical grills often employ an inert material, such as so-called "lava rocks" or ceramic tiles, to absorb drippings from food cooking on a grate positioned above the material and to radiate heat.

A disadvantage with such grills is that food drippings, such as liquified greases and oils, that come into contact with gas flames or other heat sources during cooking cause flash flames or "flare-ups," which can result in the charring of the food product being grilled. However, controlled flare-ups do impart a smoky or barbecue flavor to a food product, one of the main reasons for grilling food. Thus, it is desirable that the cooking system control flare-ups without eliminating flare-ups all together.

U.S. Pat. No. 5,121,738 discloses a ceramic, heat radiating briquette for a cooking grill. The briquette is in the form of a four-sided pyramid with a trough around its base to prevent collected drippings from cooking food to flow onto the heat source. Several such briquettes are arranged on a support grate between the heat source and food supporting grid of a cooking grill, such that the side edges of the briquettes are contiguous. This arrangement of briquettes prevents collected drippings from overflowing onto the heat source from between adjacent briquettes. Therefore, no added smoky or barbecue flavor is added to the food as a result of drippings contacting the heat source.

U.S. Pat. No. 4,593,676 discloses briquettes made of refractory material in the form of a pyramid and having flat, smooth faces but without trough around the base of the briquettes. The briquettes are arranged on a support grate positioned between a heat source and a food supporting grid of a cooking grill, such that gaps are present between adjacent briquettes. These gaps allow the drippings from the cooking food to contact the heat source directly or after contacting the briquette and flowing into the gaps. The gaps between the briquettes permits excessive flare-ups to occur when the drippings contact the heat source.

Another prior art reference discloses a grill tile in the form of a unitary refractory slab having a pattern of alternating conical-shaped holes and rectangular-shaped raised pads having wells or dimples formed on the surface of the slab. The position of the holes on the surface of the slab permits drippings which fall directly into the holes, as well as drippings which fall onto the surface of the slab, to contact the heat source, except for a minimal amount of drippings that fall into the dimples. Thus, the use of this slab may result in relatively excessive flare-ups.

Accordingly, there is a need for a grill tile which permits a relatively minimal amount of drippings from cooking food to contact the heat source and thus control flare-ups, while at the same time permits a sufficient amount of drippings to contact the heat source to provide the food with a smoky or barbecue flavor.

SUMMARY OF THE INVENTION

The present invention is a grill tile which is shaped to permit drippings from cooking food both to collect on the tile or pass through perforations in the tile and evaporate to accelerate cooking, and to pass through the tile to the heat element, where the drippings are charred to impart a smoky or barbecue flavor to the food. The grill tile of the present invention is shaped such that a relatively small proportion of the drippings contacting the tile flow through the tile to the heating element so that a smoky flavor is imparted without creating excessive flare-ups.

In accordance with the present invention, a tile for use with a cooking grill includes a base having top and bottom surfaces and is characterized by at least one boss extending upwardly from the top surface, and having a channel extending substantially vertically through the tile to the bottom surface. The channel is shaped to allow food drippings to flow through it such that a portion of the food drippings falling upon the top surface collects and is vaporized, and a relatively smaller portion of the food drippings flows through the channel to exit the bottom surface to be charred by a heating element.

In another embodiment of the present invention, the invention is a cooking system for use with a food cooking grill of a type having a heat source, a food support grid and a grate for supporting coals or the like positioned below the grid and above the heat source, and includes a plurality of tiles, each tile having a base with top and bottom surfaces, characterized by at least one boss extending upwardly from the top surface having a channel extending substantially vertically through the tile to the bottom surface, the channel being shaped to allow food drippings to flow through it such that a portion of the food drippings falling upon the top surface collects and is vaporized, and a relatively smaller portion flows through the channel to exit the bottom surface to be charred by a heating element. Each tile is shaped to be positioned on the grate in a closely-spaced array.

The present invention also includes a method for cooking a food product on a food cooking grill having a heat source, a food support grid and a grate for supporting coals or the like positioned below the grid and above the heat source, and includes the steps of providing a plurality of tiles, each tile including a base having top and bottom surfaces and at least one boss extending upwardly from the top surface having a channel extending substantially vertically through the tile to the bottom surface, the channel being shaped to allow food drippings to flow therethrough, such that a portion of the food drippings falling upon the top surface collect and are vaporized, and a relatively smaller portion flows through the channel to exit the bottom surface, arranging the tiles on the grate such that the bottom surface of the base of each tile rests on the grate, positioning the tiles such that adjacent tiles abut one another and substantially cover the grate, placing the food product on the food support grid and activating the heat source to heat the tiles and cook the food.

Accordingly, it is an object of the present invention to provide a grill tile for use with a cooking grill and a method of using the grill tile which impart a smoky or barbecue flavor to food that is cooked on an associated grill; a grill tile and method of use that minimizes flare-ups; a grill tile and method of use that collects foods drippings to evaporate and promote the cooking food; and a grill tile and method of use that can be fitted into conventional gas grills and the like.

DETAILED DESCRIPTION

Figure 1:
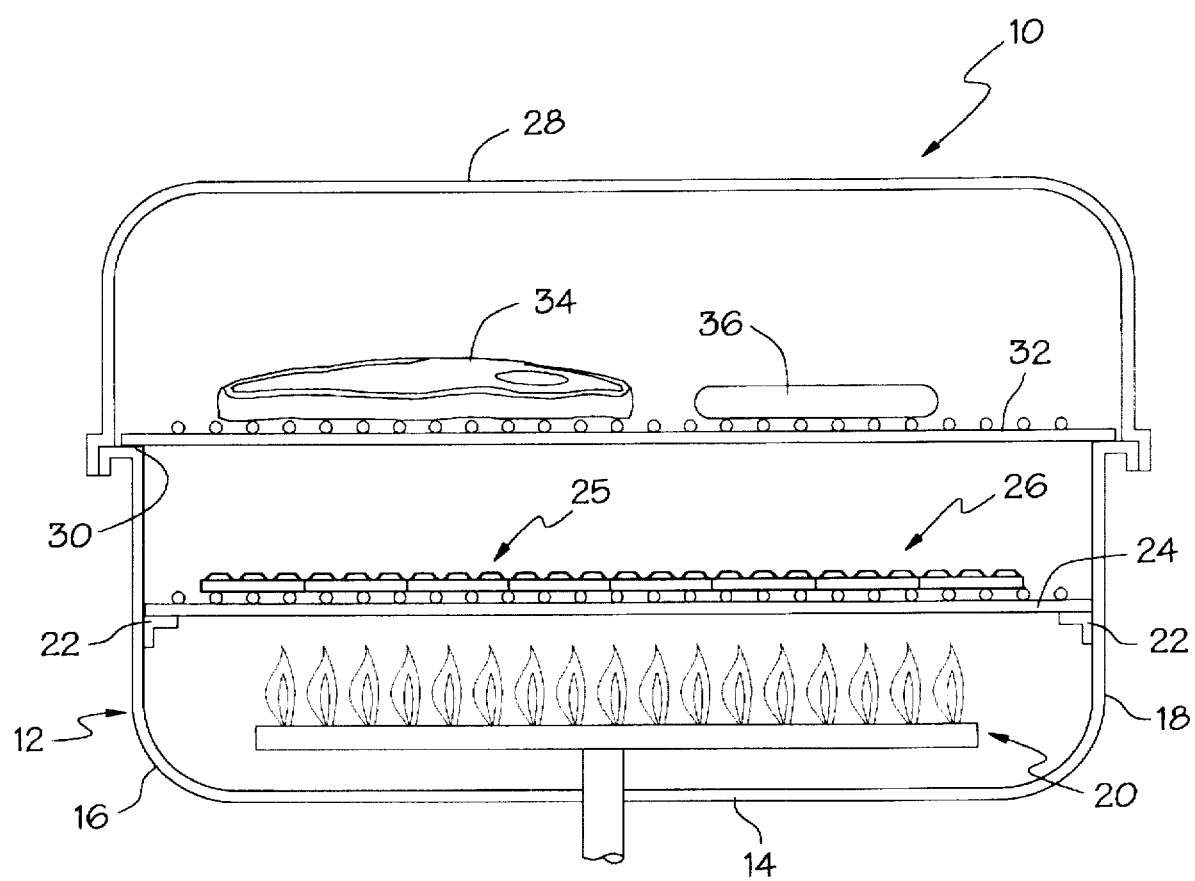
FIG. 1 is a side elevation in section taken of a cooking grill incorporating a preferred embodiment of the tiles of the present invention.

As shown in FIG. 1, a cooking grill 10 of the present invention is the type generally used for cooking or barbecuing food, and includes a bottom portion or fire-box 12, having a bottom wall 14 and upright side walls 16, 18. A heat source, such as a gas burner unit 20, is located in the fire-box 12 for generating heat inside the grill 10. Alternately, the heat source 20 could be an electrical resistance element (not shown). A pair of transverse flanges 22 are positioned above the bottom wall 14 and secured to interior surfaces of the side walls 16, 18. A support grate 24 is positioned on flanges 22.

An array 25 of tiles, generally designated 26, in accordance with the present invention are arranged on the grate 24, such that the tiles 26 rest on the grate 24. Preferably, the tiles 26 are arranged in abutting relation in order to minimize seepage of drippings between adjacent tiles 26. More preferably, the tiles 26 are arranged such that they substantially cover the grate 24.

A cover or lid 28 is mounted in a conventional manner, overlying and hinged to the open upper end 30 of the fire-box 12. A food support grid 32 is supported on the open upper end 30 of the fire-box 12 above the grate 24. A food product, preferably a meat product such as a steak 34 or a wiener 36, is positioned on the grid 32 to be grilled by radiant heat generated by the gas burner 20.

Figure 2:
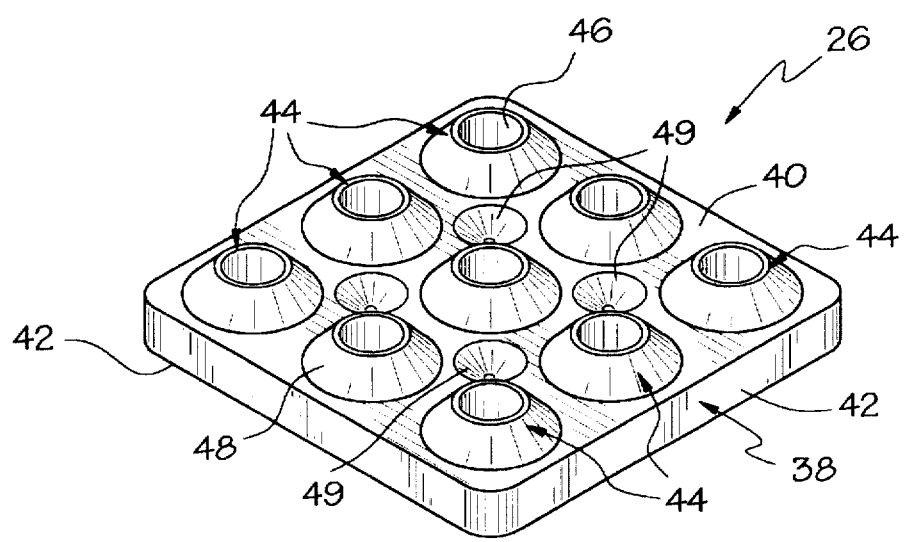
FIG. 2 is a perspective view of a preferred embodiment of a grill tile of the present invention.
Figure 3:
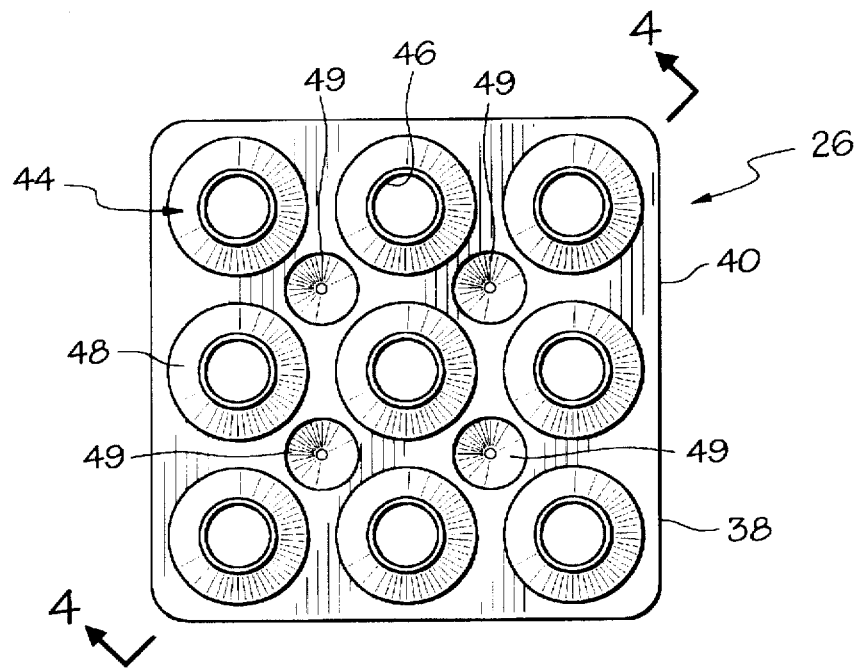
FIG. 3 is a top plan view of the tile of FIG. 2.
Figure 4:
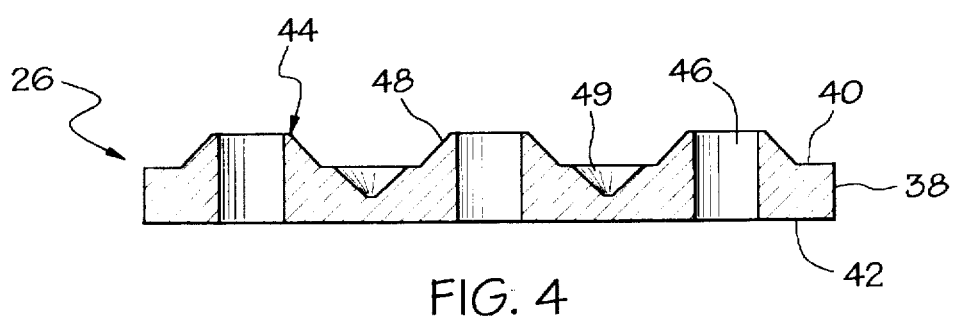
FIG. 4 is a cross-sectional view taken at line 4—4 of FIG. 3.

As shown in FIGS. 2, 3 and 4, the tile 26 is of integral structure having a base 38 with a top and bottom surfaces 40, 42 respectively, and a peripheral side wall 43. Although the base 38 can be of any shape, preferably, the base is a regular polygon such as a square or rectangle. However, those skilled in the art would appreciate that tiles of other shapes, for example, substantially circular shapes, fall within the scope of the present invention. The tile 26 can be of any size, up to the size of the entire grate 24 although the preferred size is approximately 2 in. (5 cm.) square.

Figure 5:
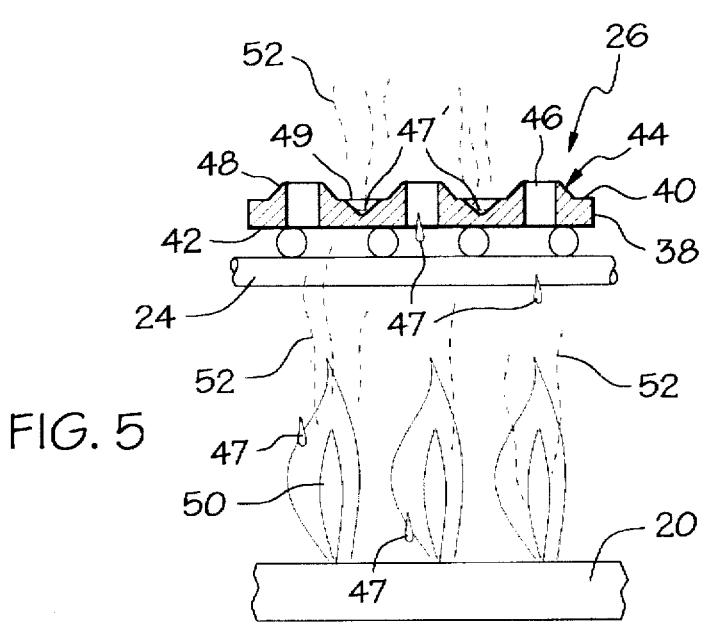
FIG. 5 is a detail showing a cross-sectional view of the tile of FIG. 2 on a on a grate above a gas burner.

At least one boss, preferably an array of bosses, generally designated 44, extends upwardly from the top surface 40 of the base 38. Each boss 44 includes a central channel 46 extending substantially vertically completely through the tile 26 to the bottom surface 42. The channel 46 is shaped to allow food drippings, generally designated 47 (as illustrated in FIG. 5), from the steak 34 and wiener 36 to flow therethrough to the burner 20 (see FIG. 1), such that a portion of the food drippings 47 falling upon the top surface 40 collect and are vaporized, and a smaller portion flows through the channel 46 to exit the bottom surface 42. The side surfaces 48 of the bosses 44 are substantially conical such that drippings 47 (see FIG. 5) flow down the sides 48 to the top surface 40. Preferably, the bosses 44 are frustoconical in shape.

Preferably, the top surface 40 of each tile 26 further includes at least one dimple 49 located centrally of the tile. More preferably, the top surface 40 includes an array of dimples 49 positioned centrally of the tile 26. The dimples 49 can be of any shape, but preferably are in the shape of an inverted cone. However, those skilled in the art will appreciate that other shapes, for example, substantially hemispherical, elliptical or irregular, would fall within the scope of the present invention.

In a preferred embodiment of the invention, as shown in FIGS. 2, 3 and 4, the dimples 49 are centrally located between the bosses 44, and the bosses 44 are uniformly arranged on the top surface 40 of the base 38.

As shown in FIGS. 1 and 5, the operation of the grill tiles 26 within the grill 10 is as follows. Heat and flame generated by the gas burner unit 20 contacts the bottom surfaces 42 of the tiles 26, which are resting on the grate 24, and heats the tiles sufficiently such that the tiles themselves radiate heat upwardly through the food support grid 24 to cook the food products 34, 36, which also are cooked by heat convection from the burner 20. As the food products 34, 36 are grilled in this manner, drippings 47, such as liquified greases or oils, are produced by the products and drip onto the tiles 26 below. A relatively smaller portion of the drippings 47 fall through the channels 46 of the bosses 44 and onto the burner flames 50. Such drippings 47 are vaporized by the heat 50 and travel upwardly to impart a smoky flavor to food products 34, 36.

In addition to the drippings 47 that flow through the channels 46, a relatively larger portion collect on the top surface 40 where such drippings 47' collect relatively temporarily, preferably in the dimples 49, and are vaporized with continued heating. The vaporization of the drippings 47' creates vapor 52 which accelerate cooking of the food product. The close proximity of abutting edges of the tiles 26 in array 25 prevents excessive amounts of drippings 47 from contacting the heat 50 or heat source 20, thereby controlling flare-ups while at the same time permitting sufficient vaporization of the drippings 47.

Preferably, the tiles 26 are molded from suitable ceramic or other refractory material which can radiate heat when heated, but which will not appreciably absorb drippings impinging thereon during grilling of the food product. More preferably, the tiles 26 are made from natural "light grey" ceramic material.

Having described the invention in detail and by reference to the drawings, it will be apparent that modification and variations are possible without departing from the scope of the invention as defined in the following claims.

What is claimed is:

1. A food cooking grill comprising:

a heat source;

a food support grid;

a grate positioned below the grid and above the heat source; and a grill tile positioned on the grate, wherein the grill tile includes a base having top and bottom surfaces, the top surface having an imperforate dimple shaped to receive and collect food drippings; and a boss extending upwardly from the top surface and having an upper surface and a channel extending through the upper surface and tile to the bottom surface and having an opening sized to occupy substantially the entire upper surface, the channel being shaped to allow food drippings to flow freely therethrough such that a portion of the food drippings falling upon the top surface collect in the imperforate dimple and are vaporized, and substantially all of the food drippings falling upon the upper surface flow through the channel to exit the bottom surface.

2. The tile of claim 1 wherein the channel and boss are shaped such that a smaller portion of the drippings falling upon the top surface flow through the channel than collect on the tile surface.

3. The tile of claim 1 wherein the imperforate dimple has a smaller surface area than does the boss.

4. The tile of claim 1 wherein the tile is formed from a refractory material.

5. The tile of claim 4 wherein the tile is formed as a ceramic member.

6. The tile of claim 1 wherein the base is shaped as a regular polygon.

7. The tile of claim 6 wherein the base is substantially square in configuration.

8. The tile of claim 6 wherein the base is substantially rectangular in configuration.

9. The tile of claim 1 wherein the base includes a peripheral side wall.

10. The tile of claim 1 wherein the boss is frusto-conical in shape.

11. A food cooking grill comprising:
   a heat source;
   a food support grid;
   a grate positioned below the grid and above the heat source; and
   a grill tile positioned on the grate, wherein the grill tile includes a base having a polygonal shape and top and bottom surfaces, the top surface having an imperforate dimple shaped to receive and collect food drippings; a boss extending upwardly from the top surface and having an upper surface and a channel extending through the upper surface and tile to the bottom surface and having an opening sized to occupy substantially the entire upper surface, the channel being shaped to allow food drippings to flow freely therethrough such that a portion of the food drippings falling upon the top surface collect in the imperforate dimple and are vaporized, and substantially all of the food drippings falling upon the upper surface flow through the channel to exit the bottom surface; and wherein the tile is formed from ceramic refractory material.

12. A food cooking system comprising:
   a food cooking grill having a heat source, a food support grid and a grate positioned below the grid and above the heat source; and
   a plurality of tiles positioned on the grate, each tile including a base having top and bottom surfaces, the top surface having an imperforate dimple shaped to receive and collect food drippings and a boss extending upwardly from the top surface and having an upper surface and a channel extending through the upper surface and tile to the bottom surface and having an opening sized to occupy substantially the entire upper surface, the channel being shaped to allow food drippings to flow freely therethrough such that a portion of the food drippings falling upon the top surface collect in the imperforate dimple and are vaporized, and substantially all of the food drippings falling upon the upper surface flow through the channel to exit the bottom surface, each tile being shaped to be positioned on the grate; and each of the tiles having a peripheral shape which permits arrangement of the tiles in a contiguous array on the grate.

13. A method for cooking a food product on a food cooking grill having a heat source, a food support grid and a grate positioned below the grid and above the heat source, comprising of the steps of:
   providing a plurality of tiles, each tile including a base having top and bottom surfaces, the top surface having an imperforate dimple shaped to receive and collect food drippings and a boss extending upwardly from the top surface and having an upper surface and a channel extending through the upper surface and tile to the bottom surface and having an opening sized to occupy substantially the entire upper surface, the channel being shaped to allow food drippings to flow freely therethrough such that a portion of the food drippings falling upon the top surface collect in the imperforate dimple and are vaporized, and substantially all of the food drippings falling upon the upper surface flow through the channel to exit the bottom surface, each tile being shaped to be positioned on the grate in a contiguous array;
   arranging the tiles on the grate such that the bottom surface of the base of each tile rests on the grate;
   positioning the tiles in a contiguous array;
   placing the food product on the food support grid; and
   activating the heat source.

14. The method of claim 13 further comprising the step of cooking the food product to generate drippings which contact the tiles and flow through the channels to contact the heat source and are vaporized.

15. The method of claim 13 wherein the imperforate dimple has a smaller surface area than the boss and further comprising the steps of collecting a portion of drippings in the dimples and heating and vaporizing the drippings in the dimple.

16. The method of claim 13 wherein the tile is formed from a refractory material.

17. The method of claim 16 wherein the tile is formed as a ceramic member.

18. The method of claim 13 wherein the base is shaped as a regular polygon.

19. The method of claim 18 wherein the base is substantially square in configuration.

20. The method of claim 18 wherein the base is substantially rectangular in configuration.

21. The method of claim 13 wherein a smaller portion of drippings contacting the tile flow through the channels.

22. A method for cooking a food product on a food cooking grill having a heat source, a food support grid and a grate for supporting coals or the like positioned below the grid and above the heat source, comprising:
   providing a plurality of tiles, each tile including a base having a polygonal shape and top and bottom surfaces, the top surface having an imperforate dimple shaped to receive and collect food drippings and a boss extending upwardly from the top surface and having an upper surface and a channel extending through the upper surface and tile to the bottom surface and having an opening sized to occupy substantially the entire upper surface, the channel being shaped to allow food drippings to flow freely therethrough such that a portion of the food drippings falling upon the top surface collect in the imperforate dimple and are vaporized, and substantially all of the food drippings falling upon the upper surface flow through the channel to exit the bottom surface, each tile being shaped to be positioned on the grate; the tile is formed from a refractory ceramic material;
   arranging the tiles on the grate such that the bottom surface of the base of each tile rests on the grate;
   positioning the tiles such that adjacent tiles abut one another and substantially cover the grate;
   placing the food product on the food support grid; and
   activating the heat source.

23. A food cooking system comprising:
   a food cooking grill having a heat source, a food support grid and a grate for supporting coals or the like positioned below the grid and above the heat source; and a tile positioned on the grate, wherein the tile includes a base having top and bottom surfaces, the top surface having an imperforate dimple shaped to receive and collect food drippings and a boss extending upwardly from the top surface and having an upper surface and a channel extending through the upper surface and tile to the bottom surface and having an opening sized to occupy substantially the entire upper surface, the channel being shaped to allow food drippings to flow freely therethrough such that a portion of the food drippings falling upon the top surface collect in the imperforate dimple and are vaporized, and substantially all of the food drippings falling upon the upper surface flow through the channel to exit the bottom surface.

24. A method for cooking a food product on a food cooking grill having a heat source, a food support grid and a grate positioned below the grid and above the heat source, comprising the steps of:

providing a tile including a base having top and bottom surfaces, the top surface having a plurality of imperforate dimples and a plurality of bosses extending upwardly from the top surface, each boss having an upper surface and a channel extending through the upper surface and tile to the bottom surface and having an opening sized to occupy substantially the entire upper surface, the bosses and channels being shaped to allow food drippings to flow freely therethrough such that a portion of the food drippings falling upon the top surface collect in the imperforate dimples and are vaporized, and substantially all of the food drippings falling upon the upper surface flow through the channel to exit the bottom surface, the tiles being shaped to be positioned on the grate in a contiguous array;

arranging the tiles on the grate such that the bottom surface of the base of each tile rests on the grate;

placing the food product on the food support grid; and activating the heat source.

* * * * *